(12) United States Patent
Keller et al.

(10) Patent No.: US 10,454,886 B2
(45) Date of Patent: Oct. 22, 2019

(54) MULTI-SERVICE API CONTROLLER GATEWAY

(71) Applicant: Citrix Systems, Inc., Fort Lauderdale, FL (US)

(72) Inventors: Steven A. Keller, Coral Springs, FL (US); Jose Reyes, Deerfield Beach, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 267 days.

(21) Appl. No.: 15/652,902

(22) Filed: Jul. 18, 2017

(65) Prior Publication Data

US 2019/0028431 A1 Jan. 24, 2019

(51) Int. Cl.
| | |
|---|---|
| *G06F 15/16* | (2006.01) |
| *H04L 29/12* | (2006.01) |
| *H04L 12/24* | (2006.01) |
| *H04L 29/08* | (2006.01) |
| *H04L 29/06* | (2006.01) |

(52) U.S. Cl.
CPC ........ *H04L 61/302* (2013.01); *H04L 41/5083* (2013.01); *H04L 61/1511* (2013.01); *H04L 61/1541* (2013.01); *H04L 61/305* (2013.01); *H04L 63/101* (2013.01); *H04L 67/10* (2013.01); *H04L 61/308* (2013.01); *H04L 61/3025* (2013.01); *H04L 61/6013* (2013.01)

(58) Field of Classification Search
CPC ........ H04L 29/08081; H04L 29/08135; H04L 41/5083; H04L 61/00; H04L 61/15–61/1511; H04L 61/1541; H04L 61/6004; H04L 61/6013; H04L 67/10
See application file for complete search history.

(56) References Cited

U.S. PATENT DOCUMENTS

| | | | | |
|---|---|---|---|---|
| 6,128,645 | A * | 10/2000 | Butman | H04L 29/06 709/203 |
| 2003/0172127 | A1 * | 9/2003 | Northrup | G06Q 10/10 709/219 |
| 2008/0250407 | A1 * | 10/2008 | Dadhia | G06F 9/45533 718/1 |
| 2014/0172944 | A1 * | 6/2014 | Newton | H04L 41/0893 709/202 |
| 2014/0211248 | A1 * | 7/2014 | Uchikawa | G06F 3/1287 358/1.15 |

(Continued)

*Primary Examiner* — Brendan Y Higa
(74) *Attorney, Agent, or Firm* — Foley & Lardner LLP; Christopher J. McKenna (57) ABSTRACT

Described embodiments provide systems and methods for hosting multiple cloud-based services at a common network address. The systems and methods receive a request addressed to a uniform resource identifier ("URI") including a domain name that is one of a plurality of different domain names mapped to a common network address. The systems and methods identify each of a service name and a controller name embedded in the URI, and identify a controller service instance using the service name and controller name from the URI, from a mapping of a plurality of controller server instances to respective service names and controller names. The systems and methods invoke an interface to the identified service instance, and pass data from the received request to the identified service instance via the interface.

20 Claims, 5 Drawing Sheets

(56) References Cited

U.S. PATENT DOCUMENTS

2015/0215276 A1\* 7/2015 Bhagwat ............. H04L 61/2015
 709/220
2018/0309720 A1\* 10/2018 Cochran ............. H04L 61/3025

\* cited by examiner

MULTI-SERVICE API CONTROLLER GATEWAY

BACKGROUND

A service developer can create a service using one or more computing devices in a first "developer" network and deploy the service into a second "production" network, where it can be hosted by one or more servers. For example, the service may be deployed in a data center, in a third-party network, a third-party multi-tenant network, or any other type of deployment network. Networks providing computing resources for a deployment are sometimes referred to as a "cloud" or cloud services network, particularly (but not limited to) third-party multi-tenant networks where the infrastructure is maintained by the third-party. Service clients may access the service in the production network from their own local networks, but might be blocked or otherwise prevented from accessing a service instance in the developer network.

A computing device (e.g., a server) provides services to other computing devices (e.g., a client) in a network by accepting network communications (e.g., packets) addressed to the server where the received communication is handled by a process (e.g., a service daemon) executed by the computing device. The process obtains the received communication by monitoring ("listening on") a communication port specific to the process or specific to a protocol used by the process. Generally, transport layer protocols include a field for designating a destination communication port by port number.

Typically, a service listens on a port assigned to the service or a port assigned to a protocol associated with the service. The Internet Assigned Numbers Authority ("IANA") maintains a "Service Name and Transport Protocol Port Number Registry" assigning specific port numbers to various transport protocols. For example, the Hypertext Transport Protocol ("HTTP") uses port 80. However, service processes may actually use any port, or multiple ports, including unassigned ports. For example, a developer of a new service or a custom service might request registration (with IANA) of one or more unassigned port numbers.

Network service providers can (and do) either restrict communications to only allow communication to a set of authorized ports (a "white list") or to block communication to a set of prohibited ports (a "black list"), e.g., using a firewall. This restriction effectively blocks access to a service that listens on a port that is not in a set of authorized ports (or inversely is in a set of prohibited ports). A computing device running a service that listens on a blocked port behind such a firewall cannot be reached by clients beyond the firewall. However, because firewalls generally allow internal devices to send data communications on any port, and allow external devices to respond to those data communications on the same port, a computing device behind a firewall might listen to blocked ports for responses to communications initiated at the computing device. This is known as "piercing" the firewall. However, this requires the device behind the firewall to initiate the communication, which a service generally doesn't do. Instead, a process might listen for new session requests on a first port (e.g., port 80 for session requests established using HTTP) and respond with instructions to a client to use a different port (e.g., port 81). The client then pierces the firewall on the second port. Firewall restrictions can be particularly problematic for a developer live testing a local instance of a service that will be later deployed outside the firewall.

Some developers wish to live test services prior to deploying them. A live test is a test in which actual service clients are able to use the service. The service clients may be "beta testers" who know that they are using a test service or they may be randomly selected "canary" testers who are diverted from a production version of the service to a test version without overt notice. Because there may be administrative delays, integration requirements, costs, and other concerns with deploying a test instance of a service into the production network, a developer may want to run the test instance in the developer network. However, the technical problems with running the test instance include access issues with network security (e.g., firewall circumvention), redirecting test clients (knowing beta testers or unknowing canary testers) to the test instance, and managing temporary integration between the test instance and any additional production resources used by the test instance (e.g., accessing live databases in the production network).

These and other technical problems are addressed by the subject matter described.

SUMMARY

This Summary is provided to introduce a selection of concepts in a simplified form that are further described below in the Detailed Description. This Summary is not intended to identify key features or essential features, nor is it intended to limit the scope of the claims included herewith.

In at least one aspect, described is a method of hosting multiple cloud-based services at a common network address. The method includes receiving, by a gateway service executed by a device comprising a processor and a network interface assigned a network address, a request addressed to a uniform resource identifier ("URI") including a domain name that is one of a plurality of different domain names mapped to the network address. The method includes identifying, by the gateway service, each of: (i) a service name and (ii) a controller name, each embedded in the URI. The method includes identifying, by the gateway service, a controller service instance hosted by the device using the service name and controller name from the URI, the device maintaining a mapping of a plurality of controller server instances to respective service names and controller names. The method includes invoking, by the gatekeeping service, an interface to the identified service instance, and passing data from the received request to the identified service instance via the interface.

In at least one aspect, described is a system hosting multiple cloud-based services at a common network address. The system includes a network interface assigned a network address. The system includes a processor coupled to memory and configured to execute instructions to receive a request addressed to a uniform resource identifier ("URI") including a domain name that is one of a plurality of different domain names mapped to the network address. The processor is configured to execute instructions to identify each of a service name and a controller name embedded in the URI, and to identify a controller service instance using the service name and controller name from the URI, from a mapping of a plurality of controller server instances to respective service names and controller names. The processor is configured to execute instructions to invoke an interface to the identified service instance, and pass data from the received request to the identified service instance via the interface.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Described herein are solutions enabling developer control over testing and debugging services, including live testing, while executing the test instance of the service in the developer network. These solutions allow a developer to simulate full service deployment in a realistic paradigm complete with real client access. In some embodiments, the deployment is transparent to services clients. That is, assuming the test instance of the service performs correctly, the fact that a client is accessing the test instance may be, from the client perspective, indistinguishable from accessing a service instance deployed in a production network.

Figure 1A:
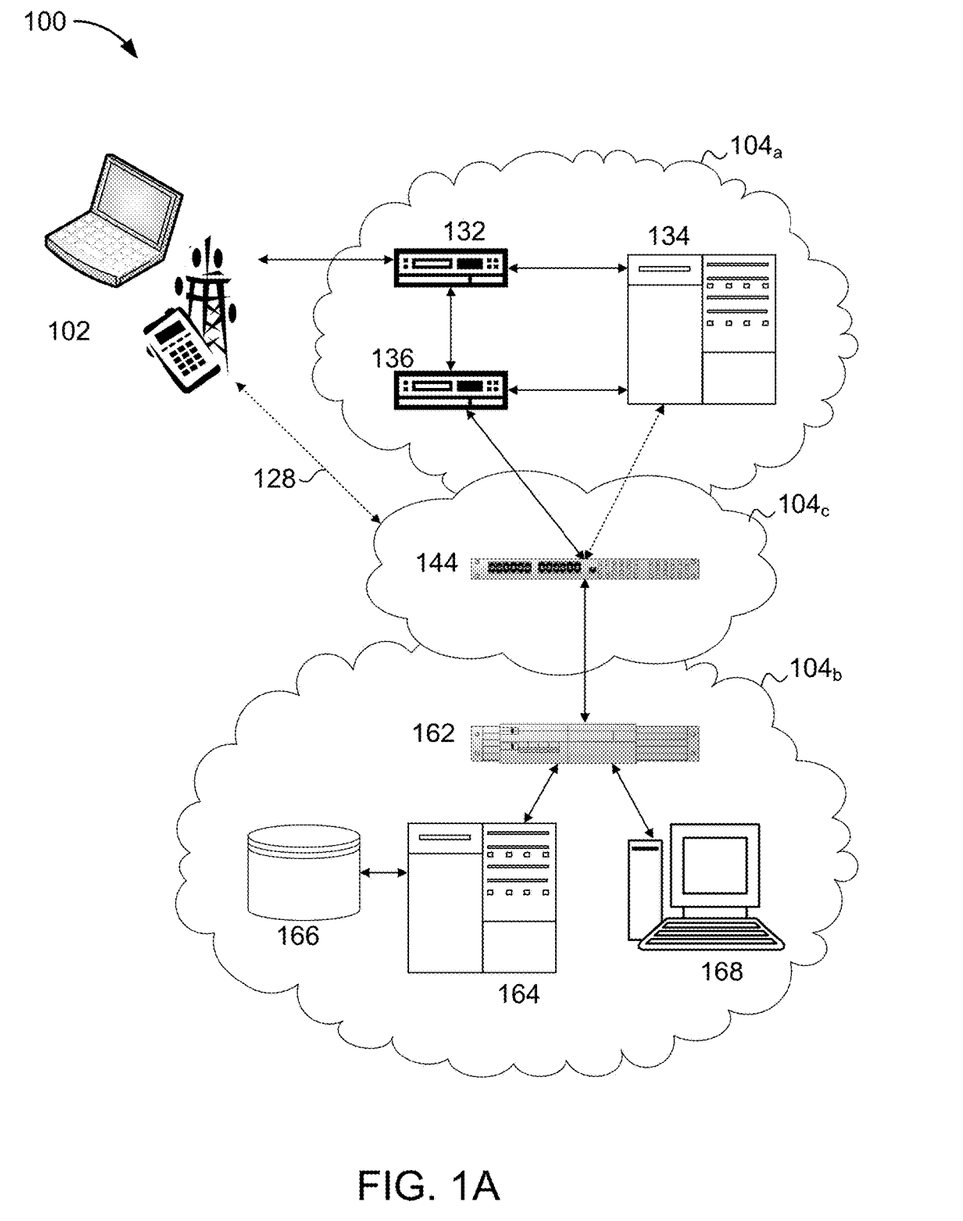
FIG. 1A is a block diagram of an illustrative network environment, in accordance with an illustrative embodiment.

FIG. 1A depicts an illustrative network environment 100. The network environment 100 includes a production network 104$_a$, a developer network 104$_b$, and one or more other networks such as a transit network 104$_c$ (the networks 104$_a$, 104$_b$, and 104$_c$ are referred to generally as networks 104). Within the network environment 100, client devices 102 communicate with servers 134, and the servers 134 provide one or more network services to the client devices 102. As shown in FIG. 1A, servers 134 are situated in the production network 104$_a$. The client devices 102 may communicate with the servers 134 directly through the production network 104$_a$ or through some intermediary network, e.g., the transit network 104$_c$. Network communications between the client devices 102 and the servers 134 flow through network devices 144 such as switches, routers, hubs, filters, firewalls, gateways, and so forth. The production network 104$_a$ includes a gateway 132 that directs traffic from client devices 102 to the servers 134. The host network 104$_a$ also includes a distributor 136, which is a network device that acts as a redirection agent or proxy. The distributor 136, can redirect traffic 128 from a client device 102 to another network 104 such as the developer network 104$_b$, e.g., via a transit network 104$_c$. One or more network devices 144 in the transit network 104$_c$ propagate the communication to a gateway device 162 in the other network 104$_b$, which may filter communications or otherwise control access to the network 104$_b$. As shown in FIG. 1A, the developer network 104$_b$ may include a local test server 164 and/or a local developer workstation 168. The local server 164 is shown with access to a data storage 166, e.g., a local database system.

Suitable examples of client devices 102 include various processor-based devices that execute instructions for interactions with servers 134 via a network 104. Some example client devices 102 receive input from a user and present output to the user. The client device 102 may be any kind of computing device, including, for example, a desktop computer, a laptop or notepad computer, a thin client, a mobile device such as a tablet or electronic "pad," a smart phone or data phone, a gaming system, or any other device capable of the functions described herein. The client devices 102 are capable of exchanging information with other computing devices via the network 104. For example, a client device 102 may exchange information over the network 104 using protocols in accordance with the Open Systems Interconnection ("OSI") layers, e.g., using an OSI layer-4 transport protocol such as the User Datagram Protocol ("UDP") or the Transmission Control Protocol ("TCP"), layered over an OSI layer-3 network protocol such as Internet Protocol ("IP"), e.g., IPv4 or IPv6. In some embodiments, the client device 102 supports network communication using Secure Socket Layer ("SSL") or Transport Layer Security ("TLS"), which encrypts communications layered over a reliable transport protocol (such as TCP). In some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla. The ICA protocol allows presentation at the client device 102 of software executing remotely (e.g., at a server 134), as though the remotely executed software were executed locally on the client device 102. In some embodiments, one or more of the servers 134 with which the client devices 102 communicate supports a custom instruction set, e.g., an application programming interface ("API"), and a custom application executed on the client device 102 implements the API. An application can implement an API using, for example, a library such as a dynamic link library ("DLL") or a software development kit ("SDK") provided to the application's developer.

Figure 1B:
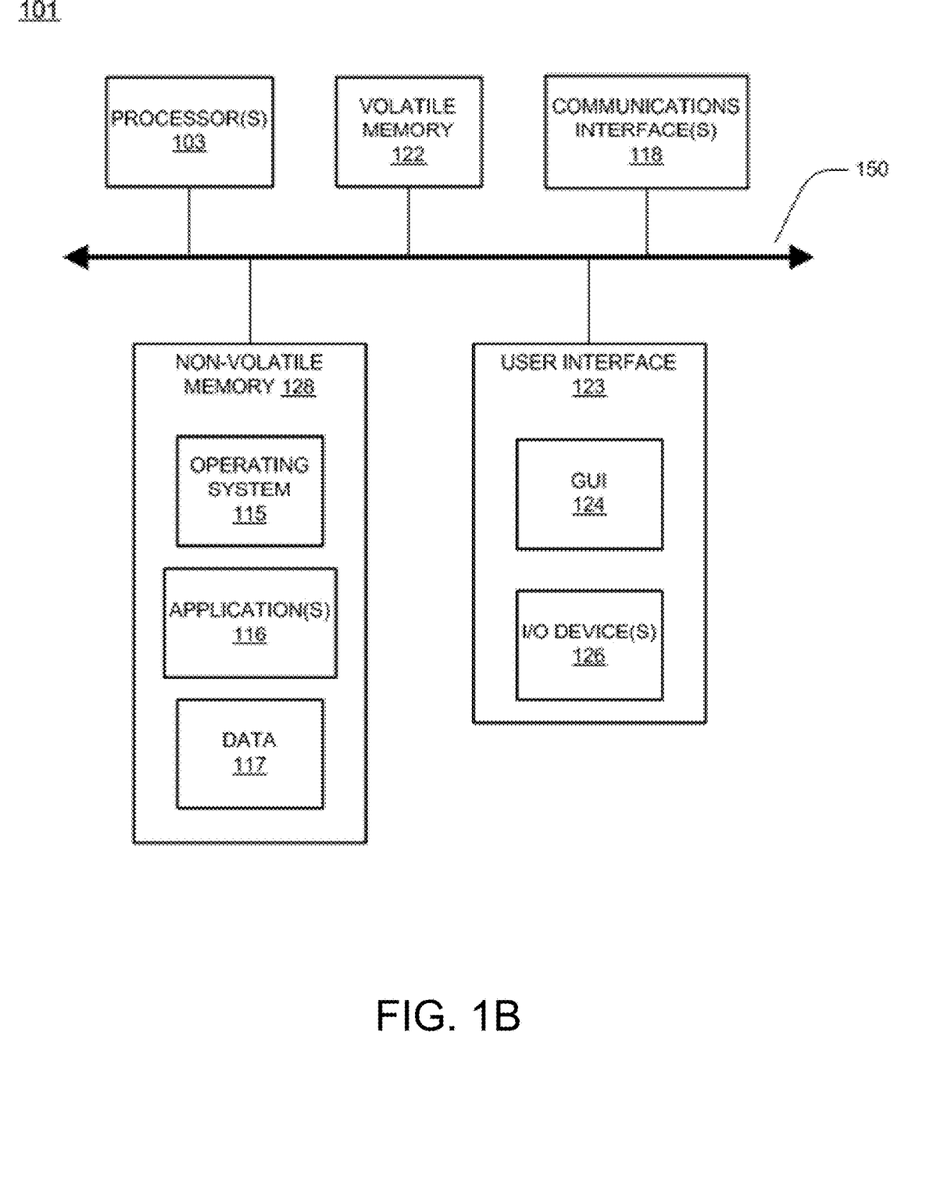
FIG. 1B is a block diagram of an example computing device, in accordance with an illustrative embodiment.

In some embodiments, the client device 102 includes one or more hardware elements for facilitating data input and data presentation. In some embodiments, the client device 102 is implemented using special purpose logic circuitry, e.g., an application specific integrated circuit ("ASIC"). In some embodiments, the client device 102 is implemented using a system on a chip ("SoC") semiconductor device that includes at least one processor (or microprocessor) core. In some embodiments, the client device 102 is implemented using a general purpose computing processor. FIG. 1B, described in more detail below, illustrates a computing device 101 that, in some configurations, is suitable for use as a client device 102.

The networks 104$_a$, 104$_b$, and 104$_c$ (referred to generally as a network 104) link devices for communication. In some embodiments, data flows through the network 104 as a flow of data packets in accordance with the OSI layers, e.g., as a TCP or ICA flow. An illustrative network 104 is the Internet; however, other networks may be used. Each network 104 may be an autonomous system ("AS"), i.e., a network that is operated under a consistent unified routing policy (or at least appears to from outside the AS network) and is generally managed by a single administrative entity (e.g., a system operator, administrator, or administrative group). A network 104 may be composed of multiple connected sub-networks or AS networks. Networks meet at boundary nodes, e.g., network devices 144 such as gateway nodes or routers. A network 104 may include wired links, optical links, and/or radio links. A network 104 may include a telephony network, including, for example, a wireless telephony network implementing a wireless communication protocol such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol. The network 104 may be public, private, or a combination of public and private networks. Each network 104 may be any type and/or form of data network and/or communication network.

The network devices 144 are network nodes that forward network data (e.g., data packets) between other network nodes. Suitable examples of network devices 144 include switches, routers, hubs, multi-homed computing devices, or any other device used for network communications. A network device 144 may include two or more network interfaces (or physical "ports," which should not be confused with transport protocol ports) and logic circuitry for identifying, for particular data, an egress interface connected to another device that will move the particular data towards a destination. In some embodiments, the network devices 144 direct traffic based on routing configuration data to forward data towards traffic destinations. In some embodiments, the network devices 144 forward data according to routing tables. In some embodiments, the network devices 144 forward data according to a configuration, e.g., a configuration set by a software defined network ("SDN") controller. In some embodiments, a network device 144 includes a content-addressable memory ("CAM") or ternary content-addressable memory ("TCAM"), used in identifying egress interfaces for routing data. In some embodiments, a network device 144 implements additional network functionality, or directs traffic through additional network nodes providing network functionality. For example, a network device 144 may pass traffic through a firewall, a network address translator ("NAT"), a network filter, or some other node providing network functionality.

One or more servers 134 may be logically grouped (e.g., as a server farm), and may either be geographically co-located (e.g., on premises) or geographically dispersed (e.g., cloud based) from client devices 102 and/or other servers 134. In some embodiments, a server 134 or group of servers 134 executes one or more applications on behalf of one or more of client devices 102 (e.g., as an application server). In some embodiments, the servers 134 provide functionality such as, but not limited to, file server, gateway server, proxy server, or other similar server functions. In some embodiments, client devices 102 may seek access to hosted applications on servers 134. In some embodiments, a network device such as the gateway 132 or specific servers 134 may provide load balancing across multiple servers 134 to process requests from client devices 102, act as a proxy or access server to provide access to the one or more servers 134, provide security and/or act as a firewall between a client 102 and a server 134, provide Domain Name Service ("DNS") resolution, provide one or more virtual servers or virtual internet protocol servers, and/or provide a secure virtual private network ("VPN") connection from a client 102 to a server 138, such as a secure socket layer ("SSL") VPN connection and/or provide encryption and decryption operations.

In described embodiments, client devices 102, servers 134, and other devices shown in FIG. 1A may be deployed as (or executed on) any type and form of computing device, such as any desktop computer, laptop computer, or mobile device capable of communication over at least one network and performing the operations described herein. For example, the client devices 102, servers 134, and other devices may each correspond to one computer, a plurality of computers, or a network of distributed computers such as the computing device 101 shown in FIG. 1B.

As shown in FIG. 1B, a computing device 101 may include one or more processors 103, volatile memory 122 (e.g., RAM), non-volatile memory 128, user interface (UI) 123, one or more communications interfaces 118 (e.g., a network interface card ("NIC")), and a communication bus 150. The user interface 123 may include hardware for a graphical user interface ("GUI") 124 (e.g., a touchscreen, a display, etc.), one or more input/output ("I/O") devices 126 (e.g., a mouse, a keyboard, a speaker, etc.). Non-volatile memory 128 stores an operating system 115, one or more applications 116, and data 117 such that, for example, computer instructions of operating system 115 and/or applications 116 are executed by processor(s) 103 out of volatile memory 122. Data 117 may be entered using an input device of GUI 124 or received from I/O device(s) 126. Various elements of the computing device 101 may communicate via communication bus 150. The computing device 101 as shown in FIG. 1B is shown merely as an example, as client devices 102, servers 138, and other network devices may be implemented by any computing or processing environment and with any type of machine or set of machines that may have suitable hardware and/or software capable of operating as described herein.

The processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more of an application specific integrated circuit ("ASIC"), microprocessor, digital signal processor, microcontroller, field programmable gate array ("FPGA"), programmable logic arrays ("PLA"), multi-core processor, or general-purpose computer processor with associated memory. The "processor" may be analog, digital, or mixed-signal. In some embodiments, the "processor" may be one or more physical processors or one or more "virtual" (e.g., remotely located or cloud-based) processors.

The communications interface 118 may include one or more interfaces to enable the computing device 101 to access a computer network 104 such as a LAN, a WAN, or the Internet through a variety of wired and/or wireless or cellular connections. In some embodiments, the communications interface 118 includes one or more network connection points (ports) and an interface controller. Network connection points may be wired connection points (e.g., Ethernet ports) or wireless (e.g., radio circuitry for Wi-Fi or mobile network communications).

The non-volatile memory 128 may include one or more of a hard disk drive ("HDD"), solid state drive ("SSD") such as a Flash drive or other solid state storage media, or other magnetic, optical, circuit, or hybrid-type storage media. In some embodiments, the non-volatile memory 128 includes read-only memory ("ROM"). In some embodiments, storage may be virtualized, e.g., using one or more virtual storage volumes, such as a cloud storage, or a combination of such physical storage volumes and virtual storage volumes.

In described embodiments, a first computing device 101 (e.g., a server 134) may execute an application on behalf of a user of a second computing device 101 (e.g., a client device 102). For example, the first computing device may execute a virtual machine providing an execution session within which applications execute on behalf of a user of the second computing device. For example, the first computing device may provide a hosted desktop session, may execute a terminal services session to provide a hosted desktop environment, or may provide access to a computing environment including one or more of: one or more applications, one or more desktop applications, and one or more desktop sessions in which one or more applications may execute. For example, in some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla.

Resources in a network 104 may be labeled using a uniform resource identifier ("URI"). The structural format of a URI is standardized (see, e.g., RFC 3986), and includes at least a host identifier for the labeled resource. The host identifier may be a network address (e.g., an IPv4 or IPv6 address). The host identifier may be a host name, e.g., a hierarchical domain name registered with a Domain Name System ("DNS"). The hierarchical domain name includes a top-level domain name associated with one or more DNS servers and a network domain name mapped (by the DNS) with a network address corresponding either to a host for the labeled resource or to a network device with additional information for reaching the host (for example, the DNS address may be associated with a gateway, with another DNS server, or with a network address translation ("NAT") device.) The hierarchical domain name may include sub-domain names. One or more DNS servers may be used to resolve a network address from the host identifier. For example, a first DNS server may be able to resolve a high level domain name to a gateway for a network, where a second DNS server may be able to further resolve a lower level subdomain name to a device within the network. The URI may also include additional information such as a protocol identifier, a port number, a path, and various request parameters. One commonly used form of URI is the uniform resource locator ("URL") used to address resources on the World Wide Web ("WWW"). If the resource is a service, the host name in the URI may be associated with a server 134 hosting the service and the protocol, port, and/or path data may correspond to the service. The server 134, upon receiving a request for the service addressed to the URI then resolves the URI to identify a service daemon to handle the received request. For example, an HTTP request for a webpage would arrive at a server (a "web server") addressed to port 80 (the default HTTP port) and the web server would pass the request to an HTTP service for processing. The web service then uses the path data to identify the requested webpage and returns associated webpage data to the requestor. However, in some embodiments, a URI request may arrive on a port that is not associated with the service (or service protocol) for processing the URI. Instead, in some embodiments, the server (or a service daemon executed by the server) processes the URI to identify one of multiple possible services for handling the request.

Figure 2:
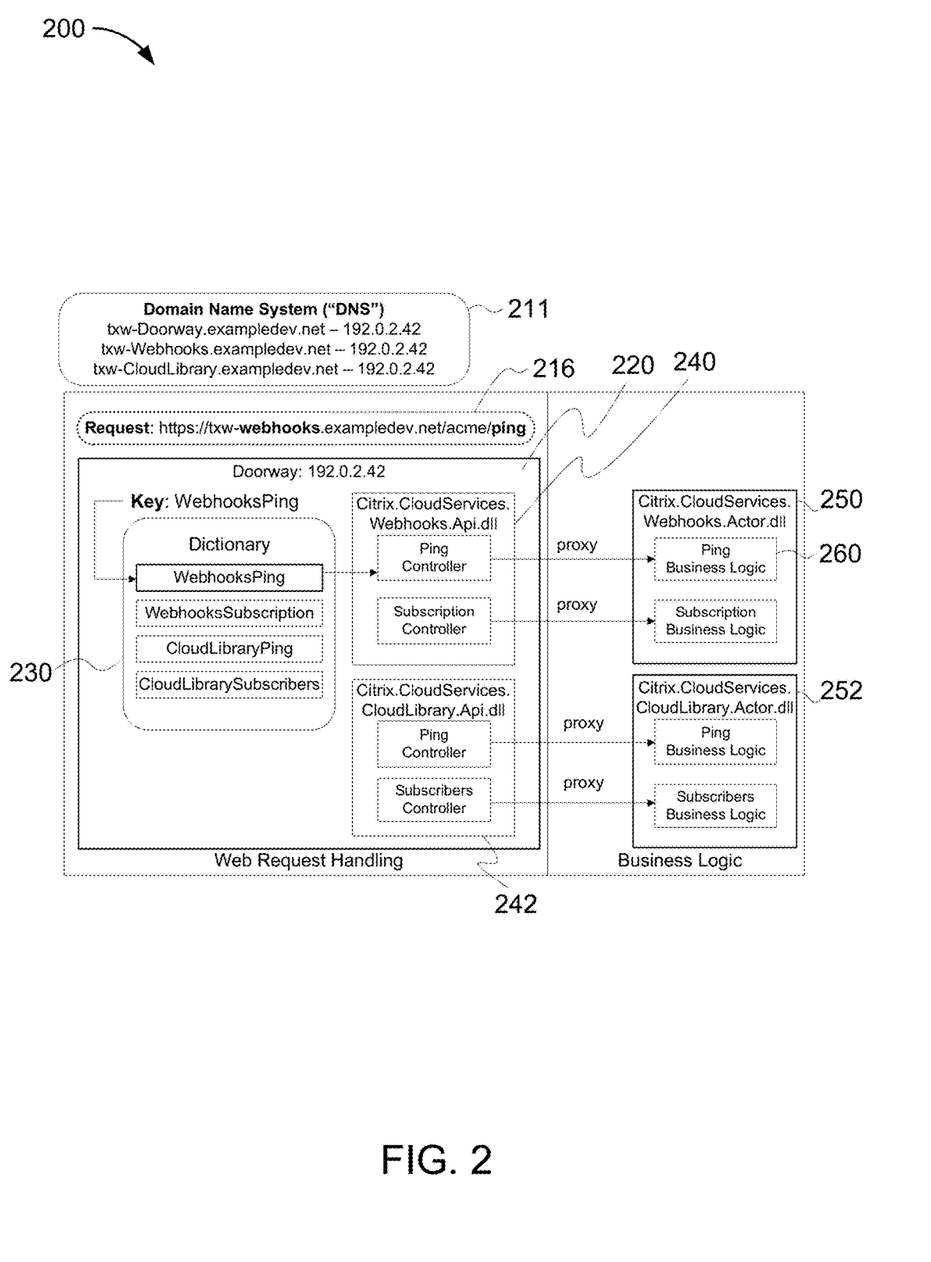
FIG. 2 is an illustrative example request resolution that is helpful in visualizing the methods described.

FIG. 2 is an illustrative example request resolution that is helpful in visualizing the methods described below in reference to the flowcharts of FIG. 3 and FIG. 4. Reference is made to a DNS registry 211, which includes entries pointing to a computing device 101 that hosts multiple services 250, and 252. The computing device 101 may be any suitable computing device 101, e.g., a server 134 or workstation 168. In FIG. 2, the computing device 101 runs a service 220 called "Doorway" that uses interface libraries 240 and 242 to pass data to the hosted services 250 and 252. As described in more detail in reference to the flowcharts in FIG. 2 and FIG. 3, when a request 216 arrives at the computing device 101, the Doorway service 220 uses a dictionary 230 to identify an interface library 240 or 242 corresponding to a requested one of the hosted services 250 and 252. The Doorway service 220 then uses the identified interface, e.g., interface library 240, to process the request, e.g., passing data to the hosted services 250 ping processing ("business") logic 260.

Figure 3:
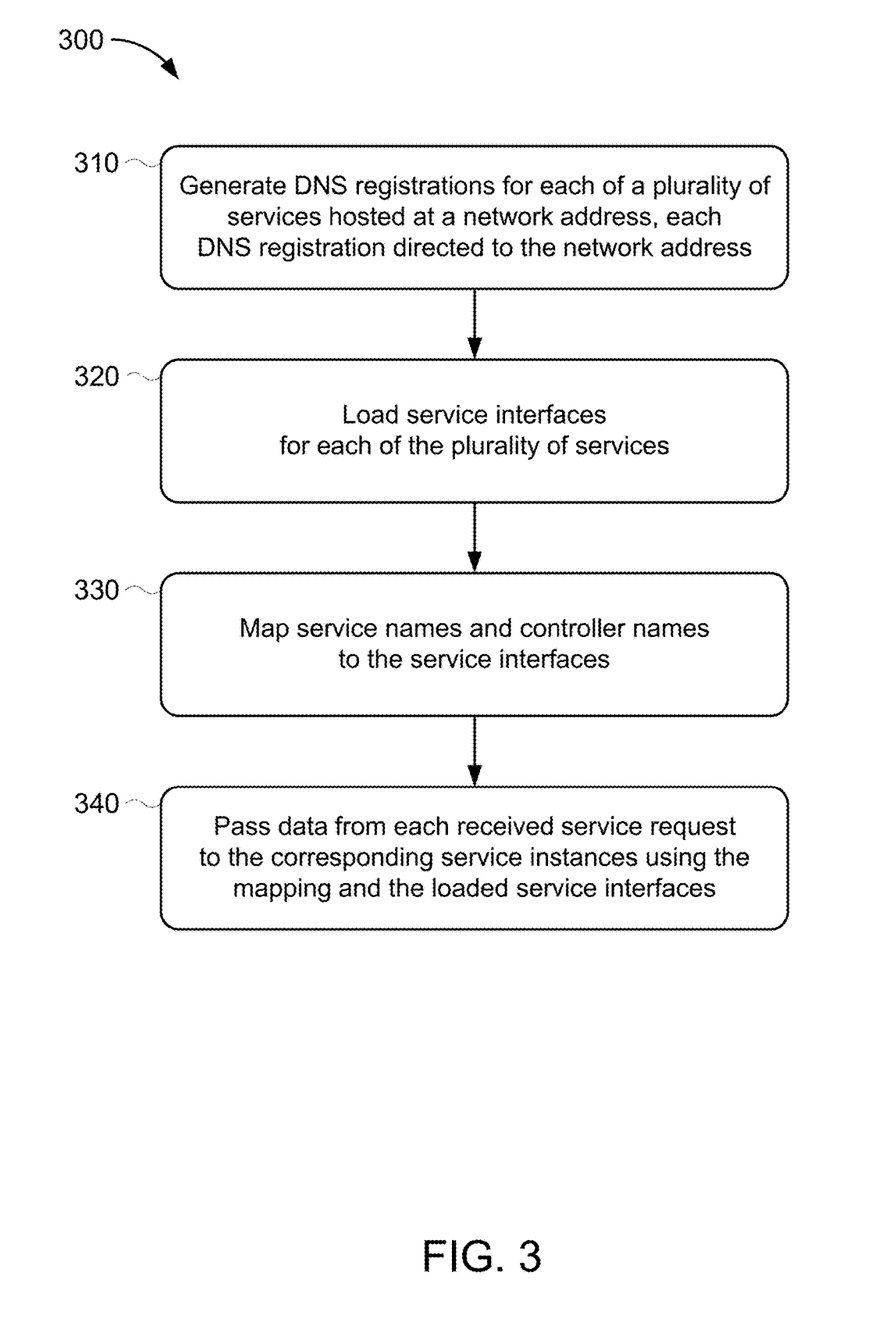
FIG. 3 is a flowchart for an example method of hosting multiple services at a device using a common network address.

FIG. 3 is a flowchart for an example method 300 of hosting multiple services at a device using a common network address. In brief overview of the method 300, at stage 310, a computing device 101 generates Domain Name System ("DNS") registrations for each of a plurality of services hosted at a shared network address, each of the DNS registrations directed to the network address. At stage 320, the computing device 101 loads service interfaces for each of the plurality of services and, at stage 330, maps service names and controller names to the service interfaces. At stage 340, the computing device 101 passes data from each received service request to the corresponding service instances using the mapping and the loaded service interfaces.

Referring to FIG. 3 in more detail, at stage 310, the computing device 101 generates Domain Name System ("DNS") registrations for each of a plurality of services hosted at a shared network address, each of the DNS registrations directed to the network address. The computing device 101 includes a network interface 118 assigned the shared network address. In some embodiments, the DNS entries are added manually, or by a separate registration system. In some embodiments, the DNS entries are registered automatically. Each service hosted by the computing device 101 has a corresponding service name.

The format of the registered domain names follows a deterministic or consistent naming scheme. For example, in some embodiments, the names are formatted with a consistent prefix (e.g., the "txw" prefix in the examples herein), a service name, and the machine and/or any hierarchical domain names up to a top level domain such as "net," "org," or "com." For example:

txw-<ServiceName>.<MachineDomain>.net

As shown in FIG. 2, three example domain names are registered in the DNS 211 using the above format, one DNS entry for the Doorway service 220 (registered as "txw-Doorway.exampledev.net"), one DNS entry for a "Webhooks" service 250 (registered as "txw-Webhooks.exampledev.net"), and one DNS entry for a "CloudLibrary" service 252 (registered as "txw-CloudLibrary.exampledev.net"). These have been registered with a DNS 211 with all three entries pointing to the same network address associated with the computing device 101, i.e., IPv4 address 192.0.2.42. The example address shown in FIG. 2 is 192.0.2.42, which is an address reserve for use in examples, documentation, and test purposes by RFC 1166 and RFC 5737. Although this example only shows two co-hosted services (i.e., a "Webhooks" service 250 and a "CloudLibrary" service 252), any number of services may be hosted in the illustrated manner.

At stage 320, the computing device 101 loads service interfaces for each of the plurality of services, e.g., interfaces 240 and 242 for the example "Webhooks" service 250 and "CloudLibrary" service 252. In some embodiments, the computing device 101 invokes the interfaces 240 and 242. In some embodiments, the interface is an Application Programming Interface ("API"). In some embodiments, the computing device 101 loads a service interface by loading or linking-in a Dynamic Link Library ("DLL"). For example, in the illustration in FIG. 2, the Doorway service 220 links in a DLL (labeled "Citrix.CloudServices.Webhooks.Api.dll") for an interface 240 to the "Webhooks" service 250 and links in a DLL (labeled "Citrix.CloudServices.CloudLibrary.Api.dll") for an interface 242 to the "CloudLibrary" service 252.

At stage 330, the computing device 101 maps service names and controller names to the service interfaces. Each service hosted by the computing device 101 has a corresponding service name and each service provides one or more functionalities, each functionality provided by a service controller. A combination of a service name and a controller name can be used as a pair to uniquely identify a particular functionality provided by a specific service. In some embodiments, the service name and the controller name are included in a Uniform Resource Identifier ("URI") in accordance with a deterministic or consistent naming scheme. For example:
   txw-<ServiceName>.<MachineDomain>.net/pathdata/<controller>

At stage 330, the computing device 101 generates a data representation (e.g., a data structure such as the dictionary 230 shown in FIG. 2) to map the specific service name and controller name pairs to the corresponding service interfaces (e.g., the interfaces 240 and 242 shown in FIG. 2) loaded at stage 320. In some embodiments, the data representation is structured to allow fast look-ups. For example, in some embodiments, the computing device 101 uses a hash table mapping the specific service name and controller name pairs to corresponding service interfaces.

At stage 340, the computing device 101 passes data from each received service request to the corresponding service instances using the mapping and the loaded service interfaces. When the Doorway service 220 receives a request (e.g., the request 216 shown in FIG. 2), the Doorway service 220 will use the dictionary 230 to look-up the corresponding interface. The Doorway service 220 parses the request 216 to extract the service name, as well as a controller name included in the request path data, and uses the extracted service name and controller name to form a key-pair for the look-up in the dictionary 230. For example, the request 216 includes a service name "Webhooks" and controller name "ping." At stage 340, the computing device 101 extracts these terms from the request URI and performs a look up for "WebhooksPing" in the dictionary 230, where it is associated with the interface 240 for the Webhooks controller 250, which provides the controller 260 implementing a ping functionality for the Webhooks service.

Figure 4:
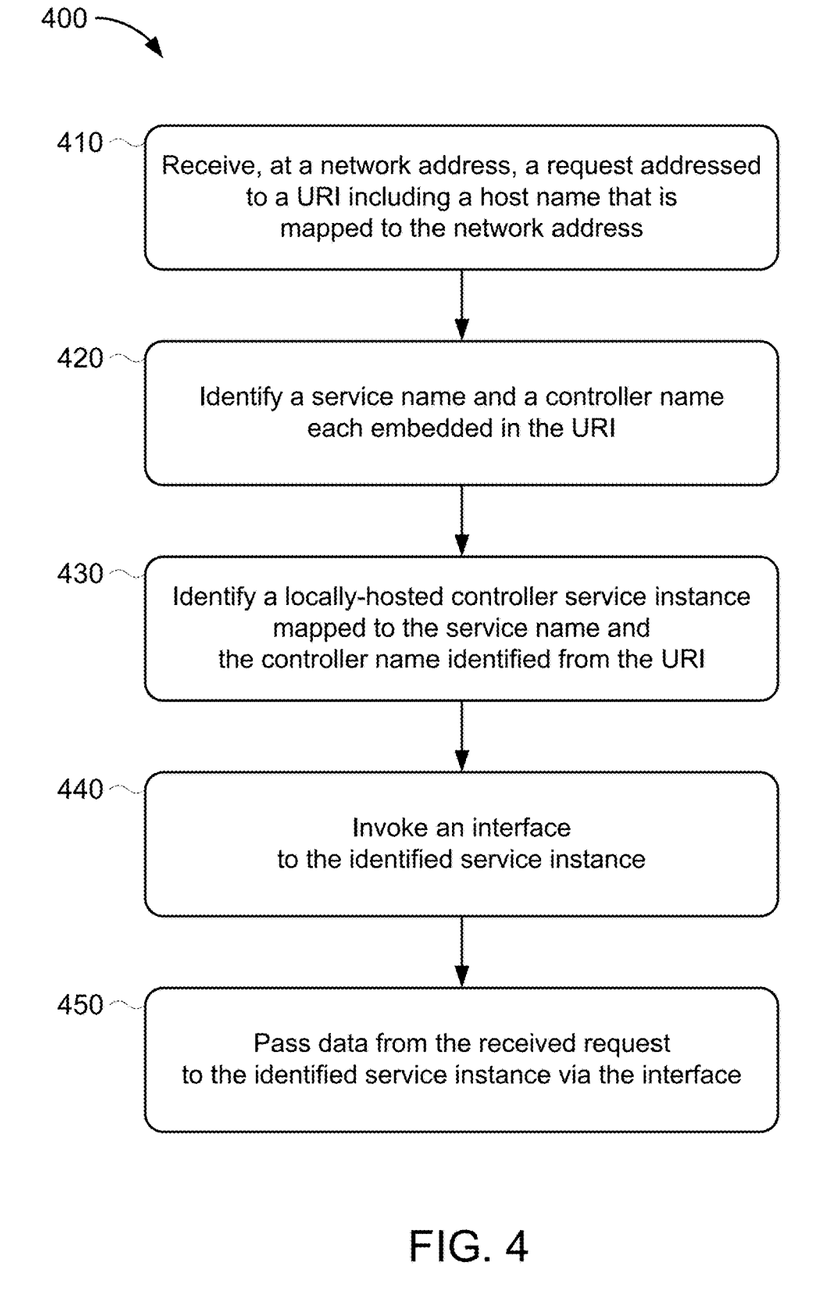
FIG. 4 is a flowchart for an example method of handling service requests at a device hosting multiple services using a common network address.

The operations of stage 340 are described in more detail in reference to FIG. 4.

FIG. 4 is a flowchart for an example method 400 of handling service requests at a device hosting multiple services using a common network address. In brief overview of the method 400, at stage 410, a computing device 101 receives, at a network address, a request addressed to a uniform resource identifier ("URI") including a host name that is mapped to the network address. At stage 420, the computing device 101 identifies a service name and a controller name each embedded in the URI. At stage 430, the computing device 101 identifies a locally-hosted controller service instance mapped to the service name and the controller name identified from the URI. At stage 440, the computing device 101 invokes an interface to the identified service instance and, at stage 450, passes data from the received request to the identified service instance via the invoked interface.

Referring to FIG. 4 in more detail, at stage 410 of the method 400, the computing device 101 receives, at a network address, a request addressed to a uniform resource identifier ("URI") including a host name that is mapped to the network address. The URI may be in the form of a Uniform Resource Locator ("URL"). In some embodiments, the host name in the URI includes a hierarchical domain name formed from a service name and a service host identifier. In some embodiments, the service name and the controller name are included in the URI in accordance with a deterministic or consistent naming scheme. For example:
   txw-<ServiceName>.<MachineDomain>.net/pathdata/<controller>

At stage 420, the computing device 101 identifies a service name and a controller name each embedded in the URI. In some embodiments, the computing device 101 uses a service such as the Doorway service 220 to parse the request URI. In some embodiments, the computing device 101 uses a regular expression engine to match the URI against one or more patterns for identifying embedded terms.

At stage 430, the computing device 101 identifies a locally-hosted controller service instance mapped to the service name and the controller name identified from the URI. In some embodiments, the computing device 101 uses the service name and the controller name extracted from the URI in stage 420 to look up the corresponding locally-hosted controller service instance in a data structure, e.g., the Dictionary 230 shown in FIG. 2. In some embodiments, the computing device 101 uses the service name and the controller name extracted from the URI in stage 420 to look up the corresponding locally-hosted controller service instance in a database. In some embodiments, the computing device 101 uses the service name and the controller name extracted from the URI in stage 420 to look up the corresponding locally-hosted controller service instance using a key based on the service name and the controller name.

In some embodiments, the computing device 101 combines the service name and the controller name extracted from the URI in stage 420 to form a key value corresponding to the locally-hosted controller service instance. For example, the key value for the Ping controller provided by the Webhooks service might be "WebhooksPing," as shown in the example dictionary 230 shown in FIG. 2. For example, a request 216 addressed to the URI "txw-webhooks.exampledev.net/acme/ping" could thus be parsed, by the computing device 101, to identify the service "webhooks" and the service controller for "ping" using the key "WebhooksPing." In some embodiments, the service and the controller are bracketed in the URI. In some embodiments, the service and the controller are marked in the URI with an indicator (e.g., using tags similar to XML, tags). In some embodiments, the key is a combination of the identified service name and the identified controller name. In some embodiments, the key combination includes a separator or demarcation indicator such as a comma, a slash, or a colon. For example, the key could be "Webhooks/Ping." In some embodiments, the computing device 101 uses two keys, e.g., a first key corresponding to the service and a second key corresponding to the controller. The computing device 101 can then lookup the locally-hosted controller service instance mapped to the key corresponding to the service name and the controller name.

At stage 440, the computing device 101 invokes an interface to the identified service instance. In some embodiments, the computing device 101 loads interfaces for each hosted service. In some embodiments, the computing device 101 loads interfaces for hosted services as needed. In some embodiments, the computing device invokes an interface for a service by executing instructions codified by an application programming interface ("API") for the corresponding service. In some embodiments, the computing device 101 executes a distribution service (e.g., the Doorway service 220 illustrated in FIG. 2) that acts as a gateway for incoming requests. The distribution service links in, or includes, libraries for interfaces to the hosted services, e.g., linking in a dynamic link library ("DLL") for each service API.

At stage 450, the computing device 101 passes data from the received request to the identified service instance via the invoked interface. In some embodiments, a distribution service, acting as a gateway, distributes the request, to the identified service instance using the identified interface (e.g., using API instructions). In some embodiments, the distribution service distributes portions of the request (e.g., a request "payload") to the identified service instance using the identified interface. For example, the request (or the URI) may include authentication or authorization data such as an authorization identifier that is processed by the distribution service. The request may include, for example, cookie data incorporating a token such as a session id that ties the request to an authenticated session. In some embodiments, a portion of the URI may be encrypted, and the encrypted data may include authentication data such as an account identifier and a password.

The data passed to the service can then be processed by logic defined by the service controller. For example, in FIG. 2, the ping controller for the webhooks service includes logic 260 for processing service ping requests.

The systems and methods described may be used in a variety of embodiments. For example, and without limitation:

In at least one aspect, the above describes a method of hosting multiple cloud-based services at a common network address. The method includes receiving, by a gateway service executed by a device comprising a processor and a network interface assigned a network address, a request addressed to a uniform resource identifier ("URI") including a domain name that is one of a plurality of different domain names mapped to the network address. The method includes identifying, by the gateway service, each of: (i) a service name and (ii) a controller name, each embedded in the URI. The method includes identifying, by the gateway service, a controller service instance hosted by the device using the service name and controller name from the URI, the device maintaining a mapping of a plurality of controller server instances to respective service names and controller names. The method includes invoking, by the gatekeeping service, an interface to the identified service instance, and passing data from the received request to the identified service instance via the interface.

Some embodiments of the method include establishing Domain Name System ("DNS") registrations mapping the plurality of different domain names to the network address assigned to the network interface. Some embodiments of the method include loading, by the gateway service, respective Application Programming Interface ("API") controllers for two or more of the plurality of controller server instances. In some embodiments of the method, the URI includes an authorization identifier, and the method includes validating the authorization identifier. Some embodiments of the method include determining that the authorization identifier indicates that the request is authorized to access the identified controller service instance. In some embodiments of the method, the plurality of controller server instances are cloud-based services hosted by the device.

In some embodiments of the method, the received request is a first request addressed to a first URI, and the method further includes receiving, by the gatekeeping service, a second request addressed to a second URI that includes a second domain name that is one of the plurality of different domain names mapped to the network address, and passing data from the second request to a second service instance. The gatekeeping service may pass requests to any reasonable number of service instances. In some embodiments of the method, the first URI and the second URI include a same port number. The requests may use the same OSI transport-layer protocol. The requests may arrive on a port number that is not affiliated with the first service or the second service.

In at least one aspect, these methods may be encoded as computer-readable instructions for execution by one or more processors. The computer-readable instructions can be encoded on non-transitory computer-readable media.

In at least one aspect, the above describes a system hosting multiple cloud-based services at a common network address. The system includes a network interface assigned a network address. The system includes a processor coupled to memory and configured to execute instructions to receive a request addressed to a uniform resource identifier ("URI") including a domain name that is one of a plurality of different domain names mapped to the network address. The processor is configured to execute instructions to identify each of a service name and a controller name embedded in the URI, and to identify a controller service instance using the service name and controller name from the URI, from a mapping of a plurality of controller server instances to respective service names and controller names. The processor is configured to execute instructions to invoke an interface to the identified service instance, and pass data from the received request to the identified service instance via the interface.

In some embodiments of the system, the processor is configured to execute instructions to include establishing Domain Name System ("DNS") registrations mapping the plurality of different domain names to the network address assigned to the network interface. Some embodiments of the method include loading, by the gateway service, respective Application Programming Interface ("API") controllers for two or more of the plurality of controller server instances. In some embodiments of the system, the URI includes an authorization identifier, and the processor is configured to validate the authorization identifier. In some embodiments of the system, the processor is configured to determine that the authorization identifier indicates that the request is authorized to access the identified controller service instance. In some embodiments of the system, the plurality of controller server instances are cloud-based services hosted by the system.

In some embodiments of the system, the received request is a first request addressed to a first URI, and the processor is further configured to receive a second request addressed to a second URI that includes a second domain name that is one of the plurality of different domain names mapped to the network address, and to pass data from the second request to a second service instance. In some embodiments of the system, the first URI and the second URI include a same port number.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method of hosting multiple cloud-based services at a common network address, the method comprising:
   receiving, by a gateway service executed by a device comprising a processor and a network interface assigned a network address, a request addressed to a uniform resource identifier ("URI") including a domain name that is one of a plurality of different domain names mapped to the network address;
   identifying, by the gateway service, each of a service name and a controller name embedded in the URI;
   identifying, by the gateway service, a controller service instance hosted by the device using the service name and controller name from the URI, the device maintaining a mapping of a plurality of controller server instances to respective service names and controller names;
   invoking, by the gatekeeping service, an interface to the identified service instance; and
   passing data from the received request to the identified service instance via the interface.

2. The method of claim 1, further comprising establishing Domain Name System ("DNS") registrations mapping the plurality of different domain names to the network address assigned to the network interface.

3. The method of claim 1, further comprising loading, by the gateway service, respective Application Programming Interface ("API") controllers for two or more of the plurality of controller server instances.

4. The method of claim 1, wherein the URI includes an authorization identifier, the method further comprising validating the authorization identifier.

5. The method of claim 4, the method further comprising determining that the authorization identifier indicates that the request is authorized to access the identified controller service instance.

6. The method of claim 1, wherein the received request is a first request addressed to a first URI, the method further comprising receiving, by the gatekeeping service, a second request addressed to a second URI including a second domain name that is one of the plurality of different domain names mapped to the network address, and passing data from the second request to a second service instance.

7. The method of claim 6, wherein the first URI and the second URI include a same port number.

8. The method of claim 1, wherein the plurality of controller server instances are cloud-based services hosted by the device.

9. A system for hosting multiple cloud-based services at a common network address, the system comprising:
   a network interface assigned a network address; and
   a processor coupled to memory and configured to execute instructions to:
     receive a request addressed to a uniform resource identifier ("URI") including a domain name that is one of a plurality of different domain names mapped to the network address;
     identify each of a service name and a controller name embedded in the URI;
     identify a controller service instance using the service name and controller name from the URI, from a mapping of a plurality of controller server instances to respective service names and controller names;
     invoke an interface to the identified service instance; and
     pass data from the received request to the identified service instance via the interface.

10. The system of claim 9, wherein the processor is further configured to establish Domain Name System ("DNS") registrations mapping the plurality of different domain names to the network address assigned to the network interface.

11. The system of claim 9, wherein the processor is further configured to load respective Application Programming Interface ("API") controllers for two or more of a plurality of controller server instances.

12. The system of claim 9, wherein the URI includes an authorization identifier, and the processor is further configured to validate the authorization identifier.

13. The system of claim 12, wherein the processor is further configured to determine that the authorization identifier indicates that the request is authorized to access the identified controller service instance.

14. The system of claim 9, wherein the received request is a first request addressed to a first URI; and wherein the processor is further configured to receive a second request addressed to a second URI including a second domain name that is one of a plurality of different domain names mapped to the network address, and pass data from the second request to a second service instance.

15. The system of claim 14, wherein the first URI and the second URI include a same port number.

16. The system of claim 9, wherein the processor is further configured to maintain a mapping of a plurality of controller server instances to respective service names and controller names, and wherein the plurality of controller server instances are cloud-based services hosted by the system.

17. A non-transitory computer-readable medium storing instructions that cause an executing processor to:
   receive a request addressed to a uniform resource identifier ("URI") including a domain name that is one of a plurality of different domain names mapped to a network address assigned to a network interface associated with the processor;

identify each of a service name and a controller name embedded in the URI;

identify a controller service instance using the service name and controller name from the URI, from a mapping of a plurality of controller server instances to respective service names and controller names;

invoke an interface to the identified service instance; and pass data from the received request to the identified service instance via the interface.

18. The non-transitory computer-readable medium of claim 17, further storing instructions that cause the executing processor to load respective Application Programming Interface ("API") controllers for two or more of a plurality of controller server instances.

19. The non-transitory computer-readable medium of claim 17, wherein the URI includes an authorization identifier, and the instructions cause the executing processor to validate the authorization identifier.

20. The non-transitory computer-readable medium of claim 19, further storing instructions that cause the executing processor to determine that the authorization identifier indicates that the request is authorized to access the identified controller service instance.

\* \* \* \* \*